(12) United States Patent
Virmani et al.

(10) Patent No.: US 9,235,586 B2
(45) Date of Patent: Jan. 12, 2016

(54) REPUTATION CHECKING OBTAINED FILES

(75) Inventors: Ritika Virmani, Seattle, WA (US);
Ryan C. Colvin, Bothell, WA (US);
Elliott Jeb Haber, Fall City, WA (US);
Warren G. Stevens, Redmond, WA (US); Jane T. Kim, Seattle, WA (US);
Jess S. Holbrook, Seattle, WA (US);
Sarah J. Bowers, Snohomish, WA (US);
John L. Scarrow, Sammamish, WA (US); Jeffrey R. McKune, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 857 days.

(21) Appl. No.: 12/880,363

(22) Filed: Sep. 13, 2010

(65) Prior Publication Data

US 2012/0066346 A1   Mar. 15, 2012

(51) Int. Cl.
*G06F 11/00* (2006.01)
*G06F 17/30* (2006.01)
*G06F 21/55* (2013.01)

(52) U.S. Cl.
CPC .......... *G06F 17/3012* (2013.01); *G06F 21/552* (2013.01)

(58) Field of Classification Search
CPC ................ G06F 21/552; G06F 17/3012
USPC .............. 726/22–25; 713/188; 709/219
See application file for complete search history.

(56) References Cited

U.S. PATENT DOCUMENTS

| | | | |
|---|---|---|---|
| 83,731 | A1 | 3/2009 | Sobel |
| 7,668,951 | B2 | 2/2010 | Lund et al. |
| 7,761,912 | B2 | 7/2010 | Yee et al. |
| 8,001,606 | B1 * | 8/2011 | Spertus ............................ 726/25 |
| 8,554,601 | B1 * | 10/2013 | Marsh et al. .................. 705/7.32 |
| 8,863,291 | B2 | 10/2014 | Oliver et al. |
| 2002/0161637 | A1 * | 10/2002 | Sugaya ............................ 705/14 |

(Continued)

FOREIGN PATENT DOCUMENTS

| | | |
|---|---|---|
| CN | 1766778 | 5/2006 |
| CN | 101164333 | 4/2008 |

(Continued)

OTHER PUBLICATIONS

"Symantec Delivers Groundbreaking Reputation-based Security Technology", Retrieved at << http://www.symantec.com/about/news/release/article.jsp?prid=20090909_02 >>, Sep. 9, 2009, pp. 4.

(Continued)

*Primary Examiner* — Saleh Najjar
*Assistant Examiner* — Peiliang Pan
(74) *Attorney, Agent, or Firm* — John Jardine; Kate Drakos; Micky Minhas

(57) ABSTRACT

A Web browser of a computing device downloads or otherwise obtains a file. File information identifying the file is obtained and is sent to a remote reputation service. Client information identifying aspects of the computing device can also optionally be sent to the remote reputation service. In response to the file information (and optionally client information), a reputation indication for the file is received from the remote reputation service. A user interface for the Web browser to present at the computing device is determined, based at least in part on the reputation indication, and presented at the computing device.

20 Claims, 5 Drawing Sheets

(56) References Cited

U.S. PATENT DOCUMENTS

| | | |
|---|---|---|
| 2005/0198181 A1 | 9/2005 | Ritter |
| 2006/0095404 A1 | 5/2006 | Adelman et al. |
| 2006/0212270 A1 | 9/2006 | Shiu et al. |
| 2006/0212931 A1 | 9/2006 | Shull et al. |
| 2006/0253581 A1 | 11/2006 | Dixon et al. |
| 2006/0253583 A1 | 11/2006 | Dixon et al. |
| 2007/0050444 A1 | 3/2007 | Costea et al. |
| 2007/0139252 A1* | 6/2007 | Barry et al. ............. 342/29 |
| 2007/0239648 A1* | 10/2007 | Thota .................. 706/47 |
| 2007/0255702 A1* | 11/2007 | Orme .................... 707/5 |
| 2008/0005223 A1 | 1/2008 | Flake et al. |
| 2008/0152082 A1* | 6/2008 | Bouchard et al. ........... 378/57 |
| 2008/0209031 A1* | 8/2008 | Zhu et al. ................ 709/224 |
| 2008/0288278 A1 | 11/2008 | Buss |
| 2008/0288330 A1* | 11/2008 | Hildebrand et al. .......... 705/10 |
| 2009/0150968 A1* | 6/2009 | Ozzie et al. ............. 726/1 |
| 2009/0204542 A1 | 8/2009 | Doman et al. |
| 2009/0217370 A1* | 8/2009 | Hulten et al. ............ 726/16 |
| 2009/0249335 A1* | 10/2009 | Vasilevsky et al. .......... 718/1 |
| 2009/0271428 A1 | 10/2009 | Adelman et al. |
| 2009/0292930 A1* | 11/2009 | Marano et al. ............. 713/189 |
| 2009/0328209 A1* | 12/2009 | Nachenberg ............. 726/22 |
| 2010/0005291 A1 | 1/2010 | Hulten et al. |
| 2010/0042942 A1* | 2/2010 | Vasilevsky et al. ........... 715/764 |
| 2010/0182148 A1* | 7/2010 | Fan ..................... 340/572.1 |
| 2011/0067101 A1* | 3/2011 | Seshadri et al. ............ 726/22 |
| 2011/0154018 A1* | 6/2011 | Edstrom et al. ............ 713/151 |
| 2011/0197159 A1* | 8/2011 | Chaganti et al. ............ 715/781 |
| 2011/0219448 A1* | 9/2011 | Sreedharan et al. .......... 726/23 |
| 2012/0167213 A1* | 6/2012 | Hulten et al. ............. 726/22 |
| 2012/0192275 A1 | 7/2012 | Oliver et al. |
| 2013/0086690 A1* | 4/2013 | Nachenberg et al. ........ 726/25 |
| 2014/0120863 A1* | 5/2014 | Ferguson et al. .......... 455/404.2 |

FOREIGN PATENT DOCUMENTS

| | | |
|---|---|---|
| CN | 101398875 | 4/2009 |
| CN | 102682235 | 9/2012 |
| WO | 2009094086 A2 | 7/2009 |

OTHER PUBLICATIONS

Cai, et al., "Three-Dimensional Based Trust Management Scheme for Virus Control in P2P Networks", Retrieved at << http://ieeexplore.ieee.org/stamp/stamp.jsp?tp=&arnumber=5501957 >>, Communications (ICC), 2010 IEEE International Conference on, May 23-27, 2010, pp. 5.

Jøsang, et al., "A Survey of Trust and Reputation Systems for Online Service Provision", Retrieved at << http://www.oasis-open.org/committees/download.php/28303/JIB2007-DSS-Survey.pdf >>, vol. 43, Issue 2, Mar. 2007, p. 1-43.

"Cisco IronPort S-Series Web Security Appliances", Retrieved at << http://www.cisco.com/en/US/solutions/collateral/ns170/ns896/ns895/ironport_s_series_datasheet.pdf >>, Aug. 9, 2010, p. 1-9.

"McAfee Web Gateway", Retrieved at << http://www.mcafee.com/us/local_content/solution_briefs/web_gateway_sb.pdf >>, Aug. 9, 2010, pp. 4.

Viralm "New Feature for Norton Internet Security 2010—Download Insight", retrieved at<<http://community.norton.com/t5/blogs/blogarticleprintpage/blog-id/npb1/article-id/325>>, Jul. 2, 2009, pp. 6.

"International Search Report", Mailed Date: Apr. 24, 2012, Application No. PCT/US2011/049807, Filed Date: Aug. 31, 2011, pp. 10.

"Foreign Office Action", CN Application No. 201110267284.7, Aug. 26, 2013, 11 Pages.

"Final Office Action", U.S. Appl. No. 13/010,189, Jan. 9, 2014, 12 pages.

"Non-Final Office Action", U.S. Appl. No. 13/010,189, Aug. 21, 2013, 12 pages.

"Non-Final Office Action", U.S. Appl. No. 13/010,189, Nov. 21, 2012, 13 pages.

"Final Office Action", U.S. Appl. No. 13/010,189, Apr. 11, 2013, 14 pages.

"Phishing Filter and Resulting Internet Communication in Windows Vista", Retrieved at: >>http://technet.microsoft.com/en-us/library/cc721947%28WS.10%29.aspx<<, 2010, 5 pages.

"Web of Trust for Firefox", Retrieved at <<http://download.cnel.com/Web-of-Trust-for-Firefox/3000-11745_4-10588554.html>> Sep. 21, 2010, Nov. 24, 2009, 7 pages.

Cai, et al., "A Reliable Study of Software Reputation Based on User Experience", Retrieved at: >>http://www.bth.se/fou/cuppsats.nsf/6753b78eb2944e0ac1256608004f0535/f4197080c36c96d6c12575d600451a82?OpenDocument<<, 2009, 63 pages.

Maximillien, "Reputation and Endorsement for Web Services", Retrieved at: <<http://www.google.com/url?sa=t&source=web&cd=6&ved=0CCoQFjAF&url=http%3A%2F%2Fciteseerx.ist.psu.edu%2Fviewdoc%2Fdownload%3Fdoi%3D10.1.1.103.8949%26rep%3Drep1%26type%3Dpdf&rct=j&q=based%20on%20reputation%20download%20software%20from%20web&e, 2001, pp. 24-31.

"Foreign Office Action", CN Application No. 201110267284.7, Sep. 29, 2014, 10 Pages.

"Notice of Allowance", U.S. Appl. No. 13/010,189, Jun. 13, 2014, 11 pages.

"Foreign Office Action", CN Application No. 201210018544.1, Apr. 2, 2014, 17 Pages.

"Foreign Office Action", CN Application No. 201110267284.7, Apr. 2, 2014, 10 Pages.

"Foreign Office Action", CN Application No. 201110267284.7, Apr. 7, 2015, 10 Pages.

"Foreign Office Action", JP Application No. 2013-529178, Jul. 2, 2015, 11 Pages.

Komatsu,"Malware fighter", Journal of Information Processing Society of Japan vol. 51, No. 3, Mar. 10, 2010, pp. 261-269.

"Foreign Notice of Allowance", CN Application No. 201110267284.7, Oct. 22, 2015, 3 pages.

* cited by examiner

REPUTATION CHECKING OBTAINED FILES

BACKGROUND

As computers have become increasingly interconnected, users have been given the option of downloading programs for their computers from numerous different sources. This wide availability of programs provides users with many choices, but it is not without its problems. One problem with downloading programs is that downloaded programs can be malware, such as virus programs, that can infect a user's computer. Oftentimes, such malware is disguised or represented as another program in an attempt to deceive users into installing the malware on their computers, making it difficult for users to correctly determine which programs they should and should not be downloading. This can lead to poor user experiences, as users can unintentionally download malware on their computers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a Web browser of a computing device downloads or otherwise obtains a file. File information identifying the file is obtained and is sent to a remote reputation service. A reputation indication for the file is received from the remote reputation service, and a user interface for the Web browser to present at the computing device is determined based at least in part on the reputation indication.

BRIEF DESCRIPTION OF THE DRAWINGS

The same numbers are used throughout the drawings to reference like features.

DETAILED DESCRIPTION

Reputation checking obtained files is discussed herein. When a file is downloaded or otherwise obtained by a Web browser of a computer, information identifying the file is obtained by the Web browser. This information is sent to a remote reputation service, which identifies a reputation indication for the identified file and returns the reputation indication to the Web browser. The reputation indication is an indication of, for example, whether the identified file is a low risk of being malware or a high risk of being malware. The Web browser presents an appropriate user interface based on the reputation indication. For example, if the reputation indication identifies the file as being a low risk of being malware then the Web browser can install and/or run the program in the file without displaying any warnings about the risk of installing files on the computer. However, if the reputation indication identifies the file as being a high risk of being malware then the Web browser can display a severe warning and/or recommendations to the user regarding installing and/or running the program in the file.

References are made herein to digital certificates and digital signatures. Although digital certificates and digital signatures are well-known to those skilled in the art, a brief overview of digital certificates and digital signatures is included here to assist the reader. Digital signatures are typically based on public key cryptography, where an entity (such as a user, hardware or software component, a device, a domain, and so forth) has associated with it a public/private key pair. The public key can be made publicly available, but the entity keeps the private key a secret. A digital signature for data can be generated using the data and the private key. Without the private key it is computationally very difficult to create a digital signature that can be verified using the public key. Any entity with the public key can use the public key to verify the digital signature by executing a suitable digital signature verification algorithm on the public key, the signature, and the data that was signed. A digital certificate can be created that includes an identifier of an entity and the public key for that entity, and the digital certificate digitally signed using the private key of that entity in order to bind the identifier of the entity to the public key for that entity.

Figure 1:
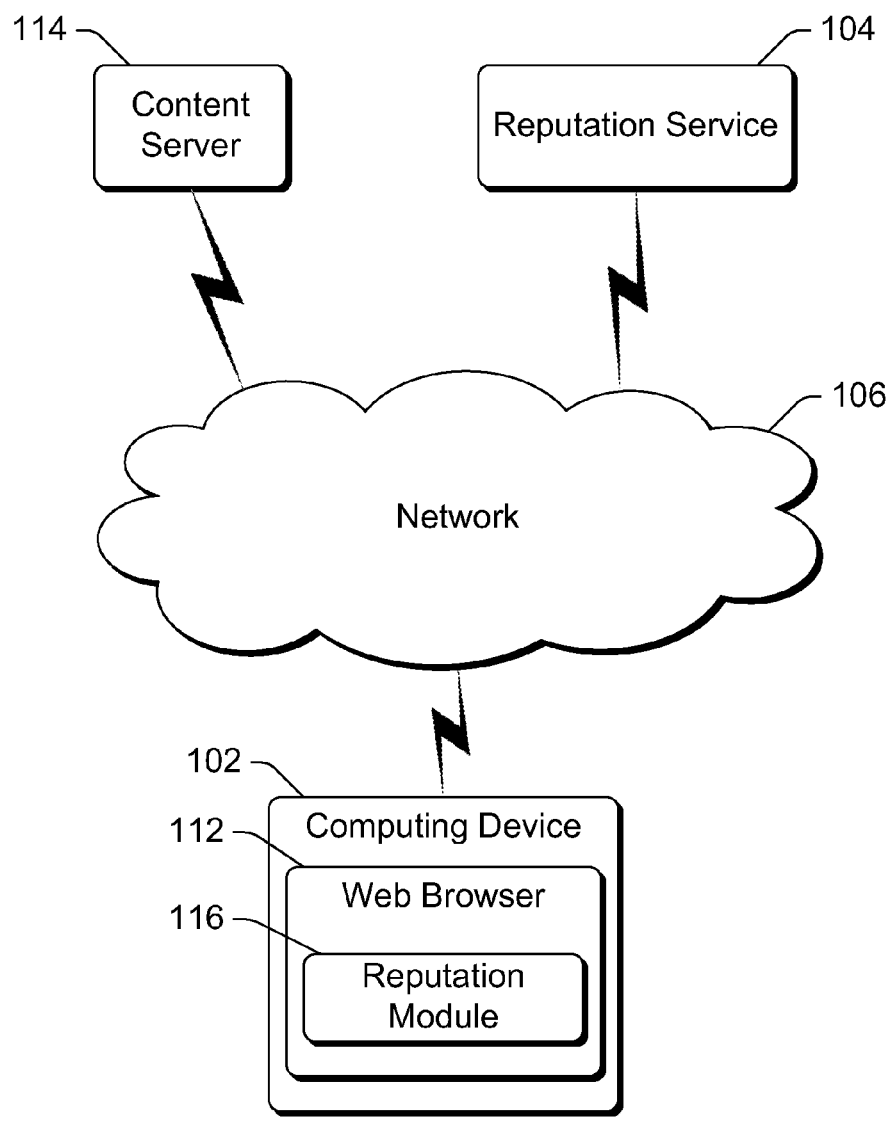
FIG. 1 illustrates an example system implementing the reputation checking obtained files in accordance with one or more embodiments.

FIG. 1 illustrates an example system 100 implementing the reputation checking obtained files in accordance with one or more embodiments. System 100 includes a computing device 102 that can communicate with a reputation service 104 via a network 106. Although a single computing device 102 is illustrated in FIG. 1, it is to be appreciated that reputation service 104 can, and typically does, communicate with multiple computing devices 102. Network 106 can be a variety of different networks, including the Internet, a local area network (LAN), a public telephone network, an intranet, other public and/or proprietary networks, combinations thereof, and so forth. Computing device 102 can also communicate with reputation service 104 and/or other devices via other types of connections using other protocols or technologies, such as universal serial bus (USB) connections, wireless USB connections, infrared connections, Bluetooth connections, and so forth.

Computing device 102 can be a variety of different types of devices. For example, computing device 102 can be a desktop computer, a mobile station, a netbook or laptop computer, a notepad or tablet computer, an entertainment appliance, a set-top box communicatively coupled to a display device, a cellular or other wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Reputation service 104 can be one or more computing devices that maintain and provide reputation information regarding files, as discussed in more detail below. Typically reputation service 104 is implemented using one or more server computers, although a variety of different types of computers (e.g., similar to the discussion above with respect to computing device 102) can be used to implement reputation service 104. Reputation service 104 is accessed via network 106 or other connection, and is also referred to as being a remote reputation service. Reputation service 104 can be in close physical proximity to computing device 102 (e.g., in the same room or building), or far-removed from computing device 102 (e.g., in another state or country).

Computing device 102 includes a Web browser 112 that allows computing device 102 to download or otherwise obtain files. For example, a user of computing device 102 can use Web browser 112 to browse or otherwise navigate to a Web site hosted by a content server 114, and download a file from that Web site via network 106 or another connection. Alternatively, files can be obtained by Web browser 112 from other sources, such as another computing device coupled to computing device 102 via network 106 or via another type of connection. Although discussions herein may refer to downloading of files, it is to be appreciated that the techniques discussed herein apply to files that are obtained in other manners.

Web browser 112 includes a reputation module 116. When a file is downloaded or otherwise obtained by Web browser 112, reputation module 116 obtains information identifying the file. The information identifying the file is sent to reputation service 104, which identifies a reputation indication for the file and returns the reputation indication to reputation module 116. Based on the reputation indication, reputation module 116 determines an appropriate user interface for Web browser 112 to display with regard to the newly obtained file. Reputation module 116 can also send to reputation service 104 information indicating a user action that is taken in response to the user interface displayed by Web browser 112 (as determined by reputation module 116).

A user of computing device 102 can input a user action that is based at least in part on the user interface determined by reputation module 116. For example, a user can choose to heed a warning in the user interface regarding the dangers of installing the obtained file, and select to have the obtained file deleted (or not installed on computing device 102). By way of another example, a user can choose to disregard a warning in the user interface regarding the dangers of installing the obtained file, and select to have the obtained file installed on computing device 102. The user can input his or her desired action in any of a variety of well-known manners, such as selecting a user interface button to install or delete the downloaded file, double-clicking on an icon to install the downloaded file, and so forth.

Additional actions can also be taken on the downloaded file (e.g., by Web browser 112 of another component or module). For example, computing device 102 can include an antivirus program that is run to analyze the downloaded file prior to sending information identifying the file to reputation service 104. A result of this analysis can be sent to reputation service 104 along with the information identifying the file.

In one more embodiments, the sending of information to reputation service 104 is performed only after receiving user consent to do so. This user consent can be an opt-in consent, where the user takes an affirmative action to request that the information be sent before reputation module 116 sends any information to reputation service 104. Alternatively, this user consent can be an opt-out consent, where the user takes an affirmative action to request that reputation module 116 not send the information to reputation service 104. If the user does not choose to opt out of this tracking, then it is an implied consent by the user for reputation module 116 to send the information to reputation service 104.

Furthermore, it should be noted that the sending of information by reputation module 116 to reputation service 104 need not include any personal information identifying particular users. For example, information identifying a file and/or a user action that is taken may be sent to reputation service 104, but no indication of the user of computing device 102 need be provided to reputation service 104 (or if provided to reputation service 104, need not be maintained by reputation service 104).

Figure 2:
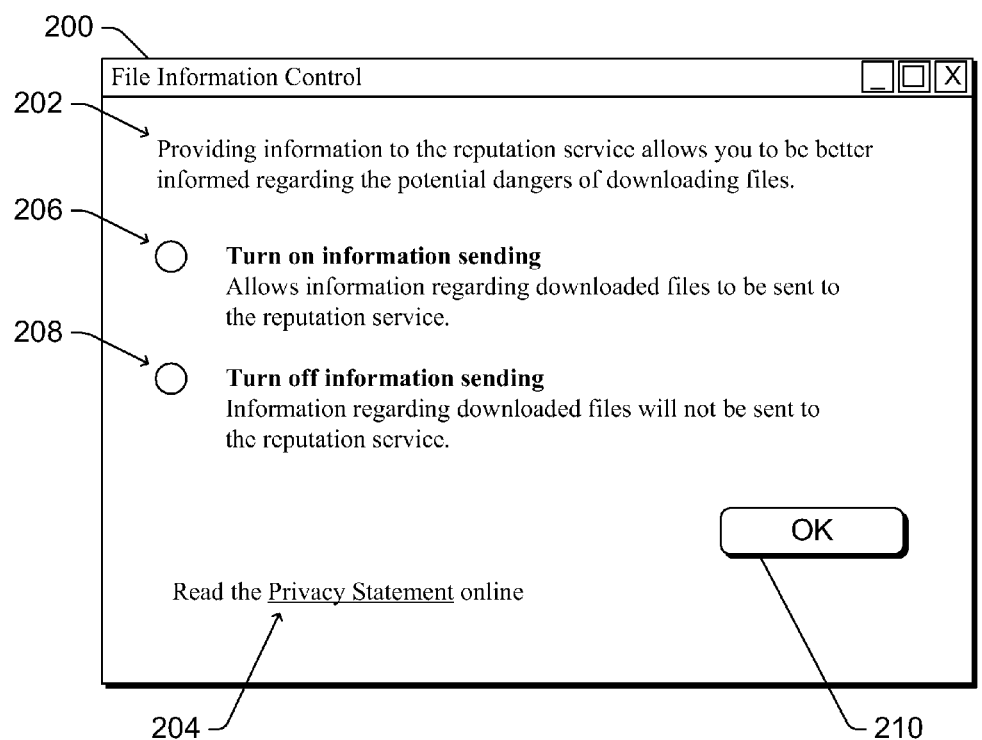
FIG. 2 illustrates an example user interface that can be displayed to a user to allow the user to select whether a reputation module will send information to a reputation service in accordance with one or more embodiments.

FIG. 2 illustrates an example user interface that can be displayed to a user to allow the user to select whether reputation module 116 will send information to reputation service 104 in accordance with one or more embodiments. A file information control window 200 is displayed including a description 202 explaining to the user why reputation module 116 is sending information to the reputation service. A link 204 to a privacy statement is also displayed. If the user selects link 204, a privacy statement of service 102 is displayed, explaining to the user how no user-identifying information is sent to remote service 104 and/or how the information sent to remote service 104 is kept confidential.

Additionally, the user is able to select a radio button 206 to opt-in to the sending of information to remote service 104, or a radio button 208 to opt-out of sending of information to remote service 104. Once a radio button 206 or 208 is selected, the user can select an "OK" button 210 to have the selection saved. It is to be appreciated that radio buttons and an "OK" button are only examples of user interfaces that can be presented to a user to opt-in or opt-out of sending information to remote service 104, and that a variety of other conventional user interface techniques can alternatively be used. Reputation module 116 then proceeds to send or not send information to remote service 104 in accordance with the user's selection.

Figure 3:
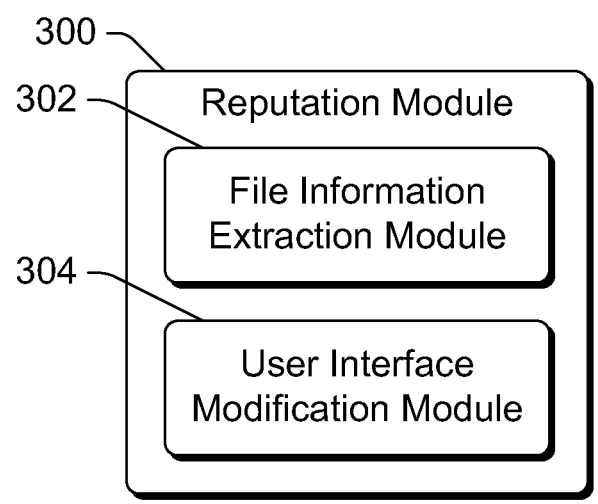
FIG. 3 illustrates an example reputation module in accordance with one or more embodiments.

FIG. 3 illustrates an example reputation module 300 in accordance with one or more embodiments. Reputation module 300 can be, for example, a reputation module 116 of FIG. 1. Reputation module 300 includes a file information extraction module 302 that obtains information identifying downloaded files, and a user interface modification module 304 that receives a reputation indication from a remote reputation service and determines an appropriate user interface for Web browser 112 to display with regard to the newly obtained file.

File information extraction module 302 obtains file information, which refers to information identifying a file downloaded by the Web browser that includes reputation module 300. This information can be obtained from a variety of different sources and in a variety of different manners, such as by analyzing the downloaded file, retrieving or analyzing metadata associated with the downloaded file, and so forth. File information extraction module 302 can also obtain client information, which refers to information identifying aspects of the computing device that includes reputation module 300, such as information identifying the computing device that downloaded the file, information identifying the Web browser and/or other components or modules of the computing device that downloaded the file. The client information can be obtained in different manners, such as by accessing a record maintained by reputation module 300 (or by some other component or module, such as the Web browser that includes reputation module 300), by querying particular components or modules, and so forth.

Table I includes examples of different types or pieces of file information and client information that can be obtained by reputation module 300. It is to be appreciated that the types of information in Table I are examples, and that other types of information can alternatively be obtained by file information extraction module 302. Additionally, it is to be appreciated that various combinations of one or more types of the information included in Table I can be obtained by file information extraction module 302.

TABLE I

| Type | Description |
|---|---|
| File hash | A hash value generated by applying a hash function to the downloaded file. |
| Digital certificate | A digital certificate included in metadata associated with the file. The digital certificate is generated by, for example, a publisher of the file and has a digital signature associated with the generator of the digital certificate. The digital certificate can include, for example, an identifier of the downloaded file, and an identifier of the generator of the digital certificate. |
| Download URL | The URL (Uniform Resource Locator) or link from which the file was downloaded. |
| Download IP | The IP (Internet Protocol) address associated with the URL or link from which the file was downloaded. |
| File version | A number or other identifier of the version of the downloaded file. |
| Valid signature | An indication of whether metadata associated with the file includes a valid digital signature of the file. |
| Client identifier | An identifier of the reputation module (or other module including the reputation module, such as the Web browser). |
| Client version | A version of the reputation module (or other module including the reputation module, such as the Web browser). |
| OS version | A version of the operating system that is running the Web browser that downloaded the file. |
| Language | A local language used by the operating system or Web browser. |
| Antivirus identifier | An identifier of an antivirus program installed on the computer that downloaded the file. |
| Antivirus result | A result of the antivirus program analyzing the downloaded file (e.g., an indication of whether the antivirus program indicated that the downloaded file was clean or infected). |
| User identifier | An identifier of the user of the Web browser (e.g., a user that is logged into the computing device that includes the Web browser when the file is downloaded). |
| Module version | An identifier of one or more other modules or dynamic link libraries (DLLs) used by the reputation module or Web browser. |

Reputation module 300 sends the information obtained by file information extraction module 302 to a remote reputation service, such as reputation service 104 of FIG. 1. The reputation service uses the received file information to identify the particular file that was downloaded, and optionally the received client information to identify information about the computer that downloaded the file (e.g., operating system running on the computer, Web browser version on the computer, etc.). The reputation service can, for example, maintain a database or other record of reputation information for files, and this reputation information is indexed by or otherwise associated with the file information. The reputation service then returns a reputation indication to reputation module 300, the reputation indication identifying the reputation information for the downloaded file.

The reputation information maintained by the remote reputation service for a file indicates a reputation for the file. Generally, the reputation for the file is an indication of how trustworthy and/or reliable the file is perceived by the reputation service as being based on actions taken with the file (such as downloading the file) by other users. The reputation for a file can indicate, for example, whether the file is known to be non-malware, whether the file is known to be malware, how frequently the file is downloaded from the Web by other users, and so forth. The reputation for a file can be based on, for example, how frequently the file is downloaded, how many times the file has been downloaded, whether the file has been reported as including malware, and so forth. The remote reputation service can obtain information to determine the reputation for a file from various sources, such as computing devices that download the file, a trusted third party service, an administrator or other trusted user of the reputation service, and so forth.

The reputation information maintained by the remote reputation service can also include other information, such as newer versions of the file. For example, the file can include a version of a program for which a newer version (e.g., and more secure version) is available. The reputation information maintained by the remote reputation service can include a link to a location where the newer version of the program can be downloaded, and can provide that link as at least part of the reputation indication that is returned to reputation module 300.

In one or more embodiments, the remote reputation service returns to reputation module 300 a reputation indication that is a particular value or rating. The different values or ratings are associated with particular reputations, and are known to user interface modification module 304. Table II includes examples of different values or ratings that can be returned by the remote reputation service to reputation module 300. It is to be appreciated that the values or ratings in Table II are examples, and that other values or ratings can alternatively be returned to reputation module 300.

TABLE II

| Rating | Description |
|---|---|
| 1 | The downloaded file is well-known and a lower risk for being malware. |
| 2 | The downloaded file is not well-known and is a higher risk for being malware. |
| 3 | The downloaded file is known to be malware. |
| 4 | The downloaded file includes an out-of-date or unsecure version of a program. |
| 5 | The downloaded file type is not supported thus no indication regarding risk is being provided by the reputation service. |
| 6 | The downloaded file includes a program that is not reliable, causes poor performance, or is not compatible. |

The remote reputation service can also include other types of information as a reputation indication in addition to, or alternatively in place of, a particular value or rating. Table III includes examples of different types of information that can be returned as a reputation indication in addition to, or alternatively in place of, a particular value or rating. It is to be appreciated that the types of information in Table III are examples, and that other types of information can alternatively be returned as a reputation indication. Additionally, it is to be appreciated that various combinations of one or more types of the information included in Table III can be returned as a reputation indication.

TABLE III

| Type | Description |
|---|---|
| Settings | Settings or configuration parameters that the Web browser (or computing device) that downloaded the file is to use when installing and/or running the program in the downloaded file. |
| User experience | The user interface to be displayed by the Web browser that downloaded the file as a warning to the user regarding the risk associated with installing and/or running the program in the downloaded file. Can be an identifier of the user interface to be displayed, or the data for the user interface to be displayed. |
| File link | A link to a different (e.g., newer or more reliable) version of a program that is included in the downloaded file. |

TABLE III-continued

| Type | Description |
| --- | --- |
| File information | The hash value or other information identifying the downloaded file for which the reputation indication is being returned. |
| Supported extensions | An indication of different types of programs (e.g., as indicated by the file name extension of the files) for which the reputation service maintains reputation information. |
| Click through sampling | A click through sampling rate for the Web browser to use when displaying the user interface. |
| File size | A maximum size of files for which the reputation service maintains reputation information. |
| Antivirus result enable | An indication of whether antivirus results are to be provided by the reputation module when file and/or client information is sent to the reputation service for subsequently downloaded files. |

User interface modification module 304 receives the reputation indication and determines, based on the received reputation indication, an appropriate user interface for the Web browser to display with regard to the downloaded file. The Web browser displays a user interface based at least in part on the appropriate user interface determined by user interface modification module 304. This determination of an appropriate user interface by user interface modification module 304 can be, for example, a determination of particular warnings regarding the downloaded file that are to be displayed, or that no warnings regarding the downloaded file are to be displayed. For example, more severe warnings can be displayed in the user interface for downloaded files that have a higher risk of being malware than for downloaded files having a lower risk of being malware.

In one or more embodiments, user interface modification module 304 maintains multiple different user interface components (e.g., dialog boxes with text or graphic warnings, audible alerts, animated warnings, etc.) that can be included in the user interface, and these user interface components are associated with particular values or ratings. User interface modification module 304 determines an appropriate user interface for the Web browser to display by identifying the user interface components associated with the value or rating received from the reputation service (e.g., one of the values or ratings discussed with reference to Table II above). In other embodiments, user interface modification module 304 determines an appropriate user interface for the Web browser to display by including in the user interface data that is received from the reputation service (e.g., the text and/or graphics to display as a warning in a dialog box, a link to another version of a file to download, and so forth).

In one or more embodiments, reputation module 300 receives a rating or value from the remote reputation service that the downloaded file is a low risk for being malware (e.g., the downloaded file is well-known as being non-malware), that the downloaded file is a higher risk for being malware (e.g., the downloaded file is not well-known as being non-malware or malware), or that the downloaded file is a very high risk (e.g., the downloaded file is known to be malware). If the downloaded file is a low risk for being malware, then user interface modification module 304 determines that the user interface is to display no warning regarding the downloaded file. Rather, the file can be installed and/or run without any warnings regarding the dangers of installing and/or running the program in the file. If the downloaded file is a higher risk for being malware, then user interface modification module 304 determines that the user interface is to display a severe warning regarding the downloaded file. This severe warning can include, for example, text and/or graphics notifying the user that the program included in the downloaded file is rarely downloaded from the Web by other users, has been identified as malware in the past, and so forth. The particular content of the warning is based on the reputation indication received from the remote reputation service. If the downloaded file is a very high risk for being malware, then user interface modification module 304 determines that the user interface is to display a warning that the downloaded file includes malware and will not be installed on the computer (or will be deleted from the computer). User interface modification module 304 can also notify the Web browser that the downloaded file includes malware, in response to which the Web browser can delete the file and/or otherwise prevent installation of the program in the downloaded file.

Thus, the user interface on the computing device can be modified as appropriate based on the reputation information received from the remote reputation service. If the downloaded file is well-known to be non-malware (e.g., has a low risk rating), then the file can be installed on the computing device without any warnings to the user regarding the dangers of downloading files from the Web. If the downloaded file is determined to be a higher risk of being malware (e.g., has a high risk rating), then a warning regarding the dangers of downloading files from the Web can be displayed to the user. And, if the downloaded file is determined be well-known malware, then a warning indicating that the downloaded file will not be installed (and optionally deleted) due to its containing malware can be displayed to the user.

It should be noted that various other appropriate user interfaces to be displayed by the Web browser can be determined by user interface modification module 304. For example, user interface modification module 304 can determine that the user interface is to include a link to a different (e.g., newer) version of a program that is included in the downloaded file. The user can then select the link in the user interface to download that different version of the program (as included in a different downloaded file). By way of another example, user interface modification module 304 can determine that the user interface is to include an indication that although the program in the downloaded file is not well-known malware, the downloaded file is known to be not reliable, cause poor performance, or be incompatible with the computing device that downloaded the file (e.g., based on the client information provided by reputation module 300 to the remote reputation service). By way of yet another example, a value or rating indicating one of any number of risk levels (e.g., ranging from a low risk of the downloaded file being malware to a high risk of the downloaded file being malware) can be received from the reputation service. User interface modification module 304 can display a different one of multiple warnings regarding the dangers of downloading files from the Web based on the risk level (e.g., ranging from a mild warning for a low risk level to a very severe warning for a high risk level).

Furthermore, user interface modification module 304 can determine that the user interface is to include information (e.g., warning information) specific to the downloaded file or to the reputation information maintained by the reputation service. For example, if the reputation service determines (based at least in part on the file information the reputation service receives from file information extraction module 302) that the program included in the file is likely a fake antivirus program, the reputation indication received from the reputation service can include an indication of such, and user interface modification module 304 can determine that the user interface is to include an indication that the downloaded file likely includes a fake antivirus program. E.g., user interface modification module 304 can determine that the user interface is to identify a warning specific to the filename that was downloaded (such as a warning "File XYZ is likely a fake antivirus program!"), or that the user interface is to identify a warning specific to the URL from which the file was downloaded (such as a warning regarding fake video scams if the URL is a known source of video files). By way of another example, if the reputation service determines that the file is rarely downloaded by users, the reputation indication received from the reputation service can include an indication of such, and user interface modification module 304 can determine that the user interface is to include an indication that the file is rarely downloaded by users.

It should also be noted that the reputation checking obtained files discussed herein is adaptable, allowing changes to the file and/or client information that is provided by reputation module 300 to the remote reputation service and/or changes to the reputation indication received by reputation module 300 from the remote reputation service. Different warnings and/or other information can thus be subsequently added to the user interface determined by user interface modification module 304.

In one or more embodiments, a user action that is in response to the user interface displayed by the Web browser (as determined by user interface modification module 304) is sent to the remote reputation service. The user action can be, for example, a user selection to install or to not install the program in the downloaded file, a user selection to delete the downloaded file, and so forth. Results of the user action can also optionally be sent to the remote reputation service, such as a user selection to install the program resulting in a virus being installed on the user's computing device. The remote reputation service can maintain a record of this user action and the warnings (if any) that were displayed to the user. The record can be maintained anonymously—no information regarding the user or the particular computing device need be maintained.

Maintaining a record of the user action and the warnings (if any) that were displayed to the user, and results of the user action, allows for various usage scenarios. For example, the reputation service can return reputation indications identifying multiple different warnings that are to be displayed for the same downloaded file (or different downloaded files having similar risks of being malware) by Web browsers on different computing devices. If the downloaded file is subsequently confirmed as being malware, then the reputation service can determine which one of the multiple different warnings was more effective in preventing the user from installing the downloaded file (e.g., the warning that resulted in fewer user actions of installing the downloaded file). The reputation service can then return the more effective warning in response to file information identifying that downloaded file (or different downloaded files having similar risks of being malware) being subsequently received from a computing device.

Figure 4:
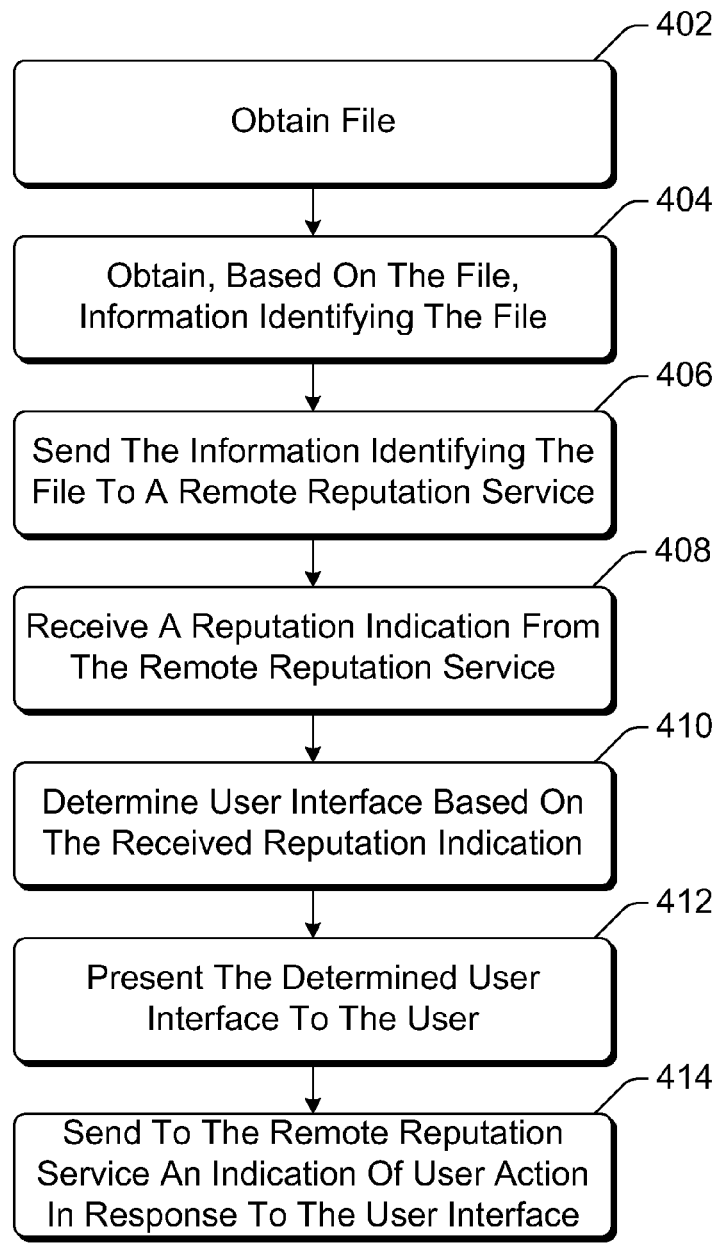
FIG. 4 is a flowchart illustrating an example process for reputation checking obtained files in accordance with one or more embodiments.

FIG. 4 is a flowchart illustrating an example process 400 for reputation checking obtained files in accordance with one or more embodiments. Process 400 is carried out by a computing device, such as computing device 102 of FIG. 1, and can be implemented in software, firmware, hardware, or combinations thereof. Process 400 is typically performed by a Web browser of the computing device. Process 400 is shown as a set of acts and is not limited to the order shown for performing the operations of the various acts. Process 400 is an example process reputation checking obtained files; additional discussions of reputation checking obtained files are included herein with reference to different figures.

In process 400, a file is obtained (act 402). This file is obtained by a Web browser, and is typically downloaded by the Web browser (e.g., from a content server).

In response to the file being downloaded or otherwise obtained, information identifying the file is obtained (act 404). This obtained information includes file information that is based on the file itself, and can also include client information as discussed above.

The information obtained in act 404 is sent to a remote reputation service (act 406). The remote reputation service uses the received information to identify a reputation indication for the file, as discussed above.

The reputation indication identified by the remote reputation service is received (act 408). A variety of different information can be received as the reputation indication, as discussed above.

A user interface based on the received reputation indication is determined (act 410). This determination in act 410 can be a determination that the user interface is to include particular warnings, that the user interface need include no warnings, and so forth as discussed above.

The user interface determined in act 410 is presented to the user (act 412). This user interface in act 412 is displayed or otherwise presented as part of the Web browser user interface.

Optionally, an indication of a user action in response to the user interface is sent to the remote reputation service (act 414). This user action can be, for example, a user selection to install a program in the obtained file, a user selection to delete the obtained file, and so forth as discussed above.

In the discussions herein, the reputation checking obtained files is discussed with reference to files that are obtained by a Web browser. It is to be appreciated, however, that the reputation checking obtained files techniques discussed herein can also be incorporated into other components or modules. For example, an operating system can include a reputation module 116 of FIG. 1 and apply the reputation checking obtained files techniques discussed herein for files downloaded or otherwise obtained by the operating system.

Figure 5:
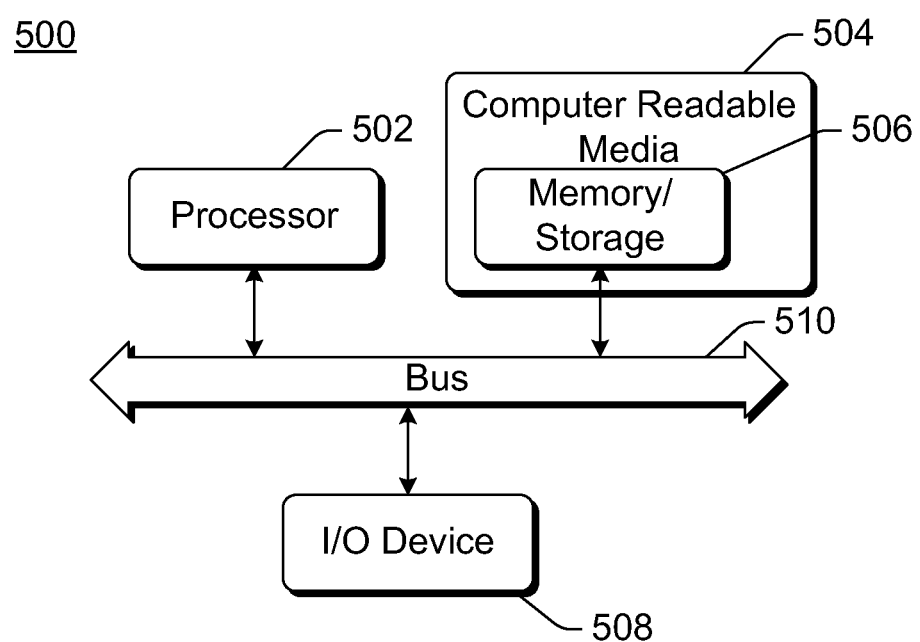
FIG. 5 illustrates an example computing device that can be configured to implement the reputation checking obtained files in accordance with one or more embodiments.

FIG. 5 illustrates an example computing device 500 that can be configured to implement the reputation checking obtained files in accordance with one or more embodiments. Computing device 500 can be, for example, computing device 102 of FIG. 1, or can implement at least part of content server 114 or reputation service 104 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the reputation checking obtained files techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a Web browser of a computing device, the method comprising:
   obtaining information identifying a file;
   sending the information identifying the file, as well as client information identifying the Web browser of the computing device that obtained the file, to a remote reputation service, the information identifying the file including a link to a location of the file;
   receiving, from the remote reputation service, a reputation indication for the file, the reputation indication being based on both the information identifying the file and the client information;
   identifying one or more user interface components associated with the reputation indication;
   determining, based at least in part on the identified one or more user interface components associated with the reputation indication, a user interface for the Web browser to present at the computing device; and
   presenting the user interface for the Web browser at the computing device, the user interface including a different link to a different location of the file from the link to the location of the file included in the information sent to the remote reputation service, the different link being provided by the remote reputation service for inclusion in the user interface.

2. The method as recited in claim 1, wherein the reputation indication includes a rating indicating whether the file is a low risk for being malware or a high risk for being malware, and the determining comprises determining that the user interface includes no warnings regarding the file if the file is a low risk for being malware, and determining that the user interface includes one or more warnings regarding the file if the file is a high risk for being malware.

3. The method as recited in claim 1, wherein the determining comprises determining, based at least in part on the reputation indication, that the user interface is to include a warning indicating that the file is rarely downloaded from the Web by other users.

4. The method as recited in claim 1, wherein the determining comprises determining, based at least in part on the reputation indication, that the user interface is to include a warning indicating that a version of a program in the file has been unreliable for other users.

5. The method as recited in claim 1, wherein the different link is provided by the remote reputation service for inclusion in the user interface in response to the remote reputation service identifying a version of the file that is more secure than a current version of the file.

6. The method as recited in claim 1, wherein the determining comprises determining, based at least in part on the reputation indication, that the user interface is to include a warning specific to the file.

7. The method as recited in claim 1, further comprising:
   receiving, from a user of the computing device, a user action in response to the user interface; and sending an indication of the user action to the remote reputation service for subsequent use by the remote reputation server in determining subsequent reputation indications for the file or for other files.

8. The method as recited in claim 1, wherein the information identifying the file comprises a hash value generated by applying a hash function to the file, and a digital signature of the file generated by a publisher of the file.

9. The method as recited in claim 1, wherein the information identifying the file comprises:
   a hash value generated by applying a hash function to the file;
   a uniform resource locator (URL) from which the file was obtained;
   an identifier of a version of the file;
   an indication of whether metadata associated with the file includes a valid digital signature of the file, and the valid digital signature of the file if the metadata associated with the file includes the valid digital signature of the file;
   an identifier of an antivirus program analyzing the file; and
   an indication of whether the antivirus program indicated that the file was clean or infected.

10. The method as recited in claim 1, wherein the reputation indication comprises:
    a rating for the file that identifies which of one or more user interface components, if any, are to be included in the user interface;
    an indication of different types of programs for which the remote reputation service maintains reputation information; and
    an indication of whether antivirus results from an antivirus program analyzing the file are to be provided to the remote reputation service for subsequently obtained files.

11. The method as recited in claim 1, wherein the reputation indication comprises a rating, the rating comprises one of multiple different ratings each associated with different one or more user interface components, and the determining comprises including the identified one or more user interface components that are associated with the rating in the presented user interface.

12. The method as recited in claim 1, wherein the determining comprises determining that the user interface includes no warnings regarding the file.

13. The method as recited in claim 1, wherein the determining comprises determining that the user interface is to include an indication that the file includes malware and thus is being deleted, the method further comprising deleting the file.

14. A computing device comprising:
    one or more processors; and
    one or more computer storage media having stored thereon multiple instructions that implement a module of a Web browser and that, when executed by the one or more processors, cause the one or more processors to:
      obtain, based on a file downloaded via a network, file information identifying the file, the file information including an identifier of an antivirus program used to analyze the downloaded file;
      send both the file information that includes the identifier of the antivirus program used to analyze the downloaded file and client information identifying aspects of the computing device to a remote reputation service;
      receive a reputation indication from the remote reputation service, the reputation indication identifying reputation information for the file based on both the file information and the client information;
      associate one or more user interface components with the reputation indication;
      determine, based at least in part on the reputation indication, a user interface for the Web browser to present at the computing device, the user interface including the one or more user interface components associated with the reputation indication; and
      include, in the determined user interface for the Web browser, an indication, provided by the remote reputation service, of whether the antivirus program used to analyze the downloaded file is to be trusted.

15. The computing device as recited in claim 14, wherein to determine the user interface is to determine, based at least in part on the reputation indication, that the user interface is to include a link to a different version of a program in the file in place of a current version of the program.

16. The computing device as recited in claim 14, wherein the instructions further cause the one or more processors to:
    receive, from a user of the computing device, a user action in response to the user interface being presented to the user; and
    send an indication of the user action to the remote reputation service for subsequent use by the remote reputation server in determining reputation indications for the file.

17. The computing device as recited in claim 14, wherein:
    the file information comprises:
      a hash value generated by applying a hash function to the file,
      a uniform resource locator (URL) from which the file was obtained,
      an identifier of a version of the file,
      an indication of whether metadata associated with the file includes a valid digital signature of the file, and the valid digital signature of the file if the metadata associated with the file includes the valid digital signature of the file; and the client information comprises an identifier of an antivirus program analyzing the file; and
      an indication of whether the antivirus program indicated that the file was clean or infected.

18. The computing device as recited in claim 14, wherein the reputation indication comprises an indication of whether antivirus results from an antivirus program analyzing the file are to be provided to the remote reputation service for subsequently obtained files.

19. The computing device as recited in claim 14, wherein to determine the user interface is to determine that the user interface is to include no warnings regarding dangers of installing the file.

20. A computing device comprising:
    one or more processors; and
    one or more computer storage media having stored thereon multiple instructions that implement a module of a Web browser and that, when executed by the one or more processors, cause the one or more processors to:
    obtain information identifying a file;
    send the information identifying the file, as well as client information identifying the Web browser of the computing device that obtained the file, to a remote reputation service, the information identifying the file including a link to a location of the file;
    receive, from the remote reputation service, a reputation indication for the file, the reputation indication being based on both the information identifying the file and the client information;

identify one or more user interface components associated with the reputation indication;

determine, based at least in part on the identified one or more user interface components associated with the reputation indication, a user interface for the Web browser to present at the computing device; and present the user interface for the Web browser at the computing device, the user interface including a different link to a different location of the file from the link to the location of the file included in the information sent to the remote reputation service, the different link being provided by the remote reputation service for inclusion in the user interface.

\* \* \* \* \*